Patented Mar. 31, 1942

2,278,158

UNITED STATES PATENT OFFICE 2,278,158

COATED ABRASIVE

Willis C. Ware, Chicago, Ill., assignor of one-half to Margaret R. Ware, Chicago, Ill.

No Drawing. Application June 24, 1940, Serial No. 342,113

10 Claims. (Cl. 51—295)

This invention relates to a coated abrasive in the form of a sheet, and more particularly to an abrasive sheet of the type which is adapted for use on machines for metal finishing operations. A common form of such a sheet is a disc adapted to be fitted to a rotary grinder.

The bulk of abrasive discs now sold for use with portable rotary grinding machines include a glue bond adhesive attaching the grit particles to a sheet base which may be vulcanized fiber or a composite cloth-paper disc. Often in addition to the glue bonding coat, the abrasive surface is sized with a second glue coat. Grinding operations with these discs are generally performed dry, and therefore a waterproof sheet is not required. However, operation of rotary grinding machines develops conditions of exceedingly high temperature adjacent the abrading surface of the disc due to the frictional contact between the abrading surface and the work. Speeds in excess of 4500 linear feet per minute are common, developing at times friction heat at the abrading surface from 750° F. to 1200° F., or higher. In some cases the grinding operation is performed upon red or white hot surfaces immediately after completion of a welding operation and before substantial cooling of the weld has taken place.

Under such conditions, glue bonded or glue sized abrasive discs become unfit for use in a relatively short time due primarily, not to the loss of abrading particles, but to the accumulation of debris in the form of dust, resulting from the abrading operation, upon the exposed surface of the glue sizing coat, or of the bonding coat where sizing is not used, which surface becomes soft and sticky to the touch as soon as a temperature of the order of 120° F. has been reached. This softened condition of the exposed glue surface may be present, even though the bonding quality of the glue bonding coat is still sufficient to hold the abrading particles to the backing, but the sticky surface thus developed attracts dust of the type described, and the accumulation fills in the spaces between the grit particles, and loss of cutting power results in a very short time. Replacement of the disc is soon necessitated. As is well known, the useful life of the disc is controlled by the duration of its cutting power, for the disc in commercial operation is discarded as soon as its cutting power has diminished to an inefficient point, even though the integrity and coherency of the disc is still unaffected. This accumulation of dust is, therefore, directly responsible for limiting the useful life of the disc to a period which is not governed by the potential cutting life of the grit itself, or by the strength or integrity of the disc as a whole. These observations concerning abrasive discs apply equally to abrasive sheets of other forms which are commonly subjected to like conditions.

Despite what I have discovered to be the inordinately short life of glue discs, they have continued to attract a large market due to the inherently satisfactory character of glue as a binding agent. Other binding agents have been suggested, but nevertheless, because of cheapness, satisfactory flexibility, and standard and uniform quality, glue is not surpassed as a bonding material for anchoring grit to a base.

The chief object of the invention is, therefore, the lengthening of the life of glue bonded abrasive sheets by providing a sheet whose useful life comes much closer to being limited solely by the strength and integrity of the sheet and by the actual cutting life of the grits per se. In other words it is an object to retain in an abrasive sheet a binder of glue, thereby taking advantage of its superior flexible bonding qualities, while overcoming the dust acquisitiveness which I have discovered, and have explained above, to be its chief deficiency. To these ends, and in accordance with this invention, a glue or other heat softenable binder which, like glue, becomes sticky to the touch at comparatively low temperatures, is sealed against exposure, but without permanently sealing the cutting surfaces of the grit, by a substantially continuous film which remains dry to the touch even at the high temperatures encountered in rotary grinding operations, and which acts in consequence to delay materially any exposure of soft sticky glue which will pick up and accumulate dust incident to an abrading operation and fractured grit particles. The film of the invention, therefore, must have a resistance to heat which will prevent softening thereof even after the underlying glue making coat has become softened. The film should also preserve its continuity even after the glue coat has become softened, so that the preserved film seals up the softened glue against exposure and prevents contact therewith of dust arising from the abrading operation. Since the film remains dry, free dust encountered in the abrading operation does not find an anchorage on, and is free to fall or be knocked from, the exposed abrading surface of the disc. The loss of cutting power due to accumulation of dust on the abrading surface is thus effectively eliminated.

The sealing film included in the abrasive sheet of this invention is endowed with certain definite physical characteristics including the property of relatively stable consistency in the presence of mounting temperatures whereby to remain dry to the touch, the properties of sufficient flexibility and coherency for preserving a continuous film characteristic during rotary grinding operations to confine the underlying glue from exposure, and the property of enhancing, to some extent at least, the abrasive action of the grit particles which engage the work. In the formation of the film, therefore, a compound which comprises inorganic material is apt to be more suitable because of their inherently higher melting points, and, as the preferred example of a material for film sealing a glue bonded abrasive disc, silicate of soda may be mentioned. Such material, or its equivalents, silicate of potassium, rubidium or caesium, comprising the group alkali metal silicates, or mixtures thereof, may be used on fine grit without further treatment as disclosed in my prior application, Ser. No. 302,322, filed November 1, 1939, of which this case is a continuation in part. It has, however, been found that, especially with large sized grit, an improved sheet is obtained when the silicate ingredient is flexibilized by adding thereto some moisture retaining substance. Any hygroscopic substance of the type of glycerine or glucose may be used. Also it has been found beneficial in the case of large sized grit to incorporate in the film sealing compound an inert filler, for example, kaolin, aluminum silicate, magnesium silicate or calcium carbonate. Thus, the following proportion of ingredients has been found suitable for a large sized grit:

| | Pounds |
|---|---|
| High ratio silicate of soda | 100 |
| Inert filler (kaolin) | 75 |
| Moisture retaining substance (glucose) | 5 |

It is to be understood, however, that the proper physical characteristics as defined in this application for accomplishing the purposes of the invention may be found in other compounds, and the success attained with materials compounded in accordance with the above formula may be equalled with other materials. According to experiments, a film laid down from an aqueous solution of the above ingredients in the proportions stated will remain dry and non-dust collecting up to 1200° F. and over, although during abrading, some loss of water may reduce the coherency of the film and permit a gradual disruption thereof. The film, being thin, does not fill in the spaces between the grits, but tends rather to follow the varying contours thereof whereby the pointed and sharp surfaces of the grits will not be smoothed to any appreciable extent. The nature of the film, moreover, is such as to provide in itself an abradent surface which, under mounting temperatures, will turn into a hard, glass-like material having excellent abrading properties.

It is contemplated that ultimately the underlying heat softened glue may become exposed and pick up and accumulate dust, but this takes place only after disruption of the seal at very elevated temperatures, and long after a present type of commercial sheet or disc would, under identical operating conditions, have been discarded. The highly satisfactory results obtained with a sheet of the type herein disclosed can thus be explained on the grounds that its life is materially lengthened by reason of the enhanced abrasive action afforded by the sealing film and by the preservation of a dry abrading surface over a substantial period of time after the glue bonding coat has become heat-softened and sticky. It is probable that the sealing film also serves as a heat insulating, or heat dispersion, coating which lessens the degree of softening of the underlying making coat, but such function is incidental and is not considered to be the principal reason for success.

The sealing film of this invention may be conveniently applied as a top or sizing coat on the grit surface as a substitute for the usual glue sizing coat heretofore used. After application, the aqueous or other liquid applying medium may be driven off by suitable drying means. In other respects fabrication of the sheet may follow known abrasive sheet manufacturing practices.

I claim:

1. A flexible abrasive sheet for use under conditions developing high abrading surface temperatures comprising a base, a layer of abrading particles spread over the base, an adhesive coat softenable by heat anchoring the abrading particles to the base, and a substantially continuous thin protective film consisting essentially of inorganic material of the alkali metal silicates group united to the adhesive coat, surrounding said particles in general conformity with the surface contours thereof, and forming a seal against exposure of the adhesive coat, said film being of relatively stable consistency and remaining dry and non-sticky at high abrading surface temperatures, thereby materially avoiding the accumulation of dust arising from the abrasion operation on and between the abrading particles irrespective of the softening of said adhesive coat at said high abrading surface temperatures.

2. A flexible abrasive sheet for use under conditions developing high abrading surface temperatures, comprising a sheet base, a layer of abrading particles spread over the base, an adhesive making coat of material of high adhesion qualities, but of relatively unstable consistency becoming sticky at temperatures exceeding 120° F., anchoring the abrading particles to the base, and a substantially continuous thin protective film consisting essentially of inorganic material of the alkali metal silicates group united to the adhesive making coat, surrounding said particles in general conformity with the surface contours thereof, and forming a seal against exposure of the material of the adhesive making coat, said film being of relatively stable consistency remaining dry and non-sticky at temperatures up to 1200° F., whereby, during use of the abrasive sheet under conditions developing heat in excess of 120° F., the abrading surface of said sheet remains substantially dry and non-sticky after said adhesive making coat has become sticky thereby materially avoiding accumulation on said abrading surface of dust arising from the abrasion operation, and substantially prolonging the abrading life of said surface.

3. A flexible abrasive sheet for use under conditions developing high abrading surface temperatures comprising a base, a layer of abrading particles spread over the base, an adhesive making coat of material of high adhesion qualities, but of relatively unstable consistency becoming sticky at temperatures exceeding 120° F., anchoring the abrading particles to the base, and a protective film of substantially uniform thickness comprising an alkali metal silicate united to the making coat, surrounding said particles in general conformity with the surface contours thereof, and forming a seal against exposure of the material of the adhesive making coat, said film being of relatively stable consistency remaining dry and non-sticky at temperatures up to 1200° F., whereby, during use of the abrasive sheet under conditions developing heat in excess of 120° F., the abrading surface of said sheet remains substantially dry and non-sticky even after said adhesive making coat has become sticky thereby materially avoiding accumulation on said abrading surface of dust arising from the abrasion operation, and substantially prolonging the abrading life of said surface.

4. A flexible abrasive sheet for use under conditions developing high abrading surface temperatures comprising a base, a layer of abrading particles spread over the base, an adhesive making coat of material of high adhesion qualities, but of relatively unstable consistency becoming sticky at temperatures exceeding 120° F., anchoring the abrading particles to the base, and a thin protective film of substantially uniform thickness comprising an alkali metal silicate, a filler, and a moisture retaining substance, united to the adhesive making coat, surrounding said particles in general conformity with the surface contours thereof, and forming a seal against exposure of the material of the adhesive making coat, said film being of relatively stable consistency remaining dry and non-sticky at temperatures up to 1200° F. and being relatively hard at such temperatures, whereby said film remains substantially dry and non-sticky at high abrading surface temperatures for materially avoiding accumulation of dust on said abrading surface and also enhancing the abrading qualities of said surface due to the hard film surrounding said abrading particles.

5. An abrasive sheet comprising a base, a making coat applied to the base, a protective coat essentially of water soluble silicate having a low heat conductivity applied over and joined to the making coat, a layer of abradant particles extending into both coats and anchored to the making coat, the protective coat being of heat resisting material of relatively stable consistency, and the making coat being of adhesive material of relatively unstable consistency tending to become soft and sticky with increase in temperature, the protective coat acting to prevent any condition of softness and stickiness from spreading through to the exterior of the sheet adjacent the free ends of the abradant particles and thereby eliminating dust and particle acquisitiveness of the heat softened making coat during use of the abrasive sheet in a dry condition on a dry surface.

6. A flexible abrasive sheet comprising a base, a making coat applied to the base, a protective coat of low heat conductivity and high abradant value applied over and joined to the making coat, a layer of abradant particles extending into both coats and anchored to the making coat, the protective coat comprising silicate of soda, and the making coat comprising glue tending to become soft and sticky with increase in temperature, the protective coat acting to prevent the condition of softness and stickiness from spreading through to the exterior of the sheet adjacent the protruding ends of the abradant particles and thereby eliminating dust and particle acquisitiveness of the heat softened making coat during use of the abrasive sheet in a dry condition on a dry surface.

7. The method of protecting a thermoplastic adhesive making coat of an abrasive sheet which comprises the step of applying over such a making coat a thin protective film of heat-resisting material which will not soften or become tacky at temperatures which otherwise would soften and render the making coat tacky.

8. The method of protecting a thermoplastic adhesive making coat of an abrasive sheet which comprises the step of applying over such a making coat a thin continuous protective film which is relatively resistant to softening, tackiness and disintegration in the presence of mounting temperatures such as would tend to soften and render the making coat tacky whereby to maintain over the making coat a seal to prevent contact therewith of loose foreign particles.

9. A flexible abrasive sheet for use under conditions developing high abrading surface temperatures comprising a base, a layer of abrading particles spread over the base, an adhesive coat softenable by heat anchoring the abrading particles to the base, and a substantially continuous thin protective film consisting essentially of water soluble high ratio silicate of soda united to the adhesive coat, surrounding said particles in general conformity with the surface contours thereof, and forming a seal against exposure of the adhesive coat, said film being of relatively stable consistency and remaining dry and non-sticky at high abrading surface temperatures, thereby materially avoiding the accumulation of dust arising from the abrasion operation on and between the abrading particles irrespective of the softening of said adhesive coat at said high abrading surface temperatures.

10. A flexible abrasive sheet comprising a base, a making coat applied to the base, a protective coat of low heat conductivity and high abradant value applied over and joined to the making coat, a layer of abradant particles extended into both coats and anchored to the making coat, the protective coat comprising high ratio silicate of soda, and the making coat comprising glue tending to become soft and sticky with increase in temperature, the protective coat acting to prevent the condition of softness and stickiness from spreading through to the exterior of the sheet adjacent the protruding ends of the abradant particles and thereby eliminating dust and particle acquisitiveness of the heat softened making coat during use of the abrasive sheet in a dry condition on a dry surface.

WILLIS C. WARE.